(12) United States Patent
Ueno et al.

(10) Patent No.: US 10,386,566 B2
(45) Date of Patent: Aug. 20, 2019

(54) VEHICLE CUP-HOLDER WITH ILLUMINATING LIGHT GUIDE

(71) Applicant: NIFCO INC., Yokosuka-shi, Kanagawa (JP)

(72) Inventors: Taeko Ueno, Yokosuka (JP); Sachiko Koyama, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/577,143

(22) PCT Filed: May 25, 2016

(86) PCT No.: PCT/JP2016/065408
§ 371 (c)(1),
(2) Date: Nov. 27, 2017

(87) PCT Pub. No.: WO2016/190336
PCT Pub. Date: Dec. 1, 2016

(65) Prior Publication Data
US 2018/0172896 A1 Jun. 21, 2018

(30) Foreign Application Priority Data
May 28, 2015 (JP) .................... 2015-108239

(51) Int. Cl.
*B60Q 3/225* (2017.01)
*B60Q 3/64* (2017.01)
(Continued)

(52) U.S. Cl.
CPC ....... *G02B 6/0046* (2013.01); *A47G 23/0309* (2013.01); *B60N 3/101* (2013.01); *B60Q 3/20* (2017.02); *B60Q 3/64* (2017.02)

(58) Field of Classification Search
CPC .... F21W 2106/00; B60Q 3/225; B60Q 3/233; B60Q 3/267; B60Q 3/275; B60Q 3/64
See application file for complete search history.

(56) References Cited

U.S. PATENT DOCUMENTS 2,259,910 A * 10/1941 Rylsky .................. G01D 11/28
220/664
7,486,885 B2 * 2/2009 Tenmyo ............... G02B 6/0001
362/16

(Continued)

FOREIGN PATENT DOCUMENTS

EP       2846082 A1    3/2015
JP    2008-213612 A    9/2008
(Continued)

OTHER PUBLICATIONS

Japan Patent Office, "Office Action for Japanese Patent Application No. 2017-520731," dated Jul. 24, 2018.
(Continued)

*Primary Examiner* — Ismael Negron
(74) *Attorney, Agent, or Firm* — Manabu Kanesaka

(57) ABSTRACT

A vehicle lighting device includes a storage member with an opening for receiving an object and a support bottom portion; a light source; and a light guide member including an incident portion positioned on an outer peripheral portion side of the light guide member, a light emission surface arranged along an edge of the opening, and a shielding wall positioned between the outer peripheral portion and the inner peripheral portion and extending along the receiving opening. The light guide member further includes a portion where a distance between the inner peripheral portion and the outer peripheral portion is gradually reduced as it moves in from the incident portion.

6 Claims, 9 Drawing Sheets

(51) Int. Cl.
  *F21V 8/00* (2006.01)
  *B60Q 3/20* (2017.01)
  *A47G 23/03* (2006.01)
  *B60N 3/10* (2006.01)

(56) References Cited

U.S. PATENT DOCUMENTS

| | | | | |
|---|---|---|---|---|
| 8,246,228 B2* | 8/2012 | Ko | ................ | G02B 6/0061 |
| | | | | 362/511 |
| 8,485,680 B2* | 7/2013 | Anderson | ............. | B60N 3/108 |
| | | | | 224/926 |
| 8,515,274 B2* | 8/2013 | Daijo | ................ | G02B 6/0018 |
| | | | | 362/16 |
| 9,618,676 B2* | 4/2017 | Sakanashi | ................ | B60N 3/10 |
| 9,783,104 B2* | 10/2017 | Koizumi | ................ | B60N 3/101 |
| 10,071,682 B2* | 9/2018 | Koyama | ................ | B60N 3/10 |
| 2007/0159846 A1* | 7/2007 | Nishiyama | ............. | G01D 11/28 |
| | | | | 362/602 |
| 2008/0266853 A1* | 10/2008 | Goto | ................ | G02B 6/0006 |
| | | | | 362/240 |
| 2010/0080010 A1 | 4/2010 | Marui et al. | | |
| 2013/0128620 A1 | 5/2013 | Kosuge et al. | | |
| 2013/0258670 A1 | 10/2013 | Abro et al. | | |
| 2015/0062968 A1* | 3/2015 | Shiraishi | ............. | G02B 6/0011 |
| | | | | 362/628 |
| 2015/0191116 A1* | 7/2015 | Forrest | ................ | B60N 3/101 |
| | | | | 362/516 |
| 2016/0195661 A1* | 7/2016 | Koyama | ................ | G02B 6/001 |
| | | | | 362/606 |
| 2017/0182937 A1* | 6/2017 | Takahama | ................ | B60N 3/10 |

FOREIGN PATENT DOCUMENTS

| | | |
|---|---|---|
| JP | 2010-083211 A | 4/2010 |
| JP | 2010-525546 A | 7/2010 |
| JP | 2013-109942 A | 6/2013 |
| JP | 2013-222657 A | 10/2013 |
| JP | 2014-091399 A | 5/2014 |
| JP | 2015223968 A | 12/2015 |
| WO | 2011/148580 A1 | 12/2011 |

OTHER PUBLICATIONS

PCT/ISA/210, "International Search Report for International Application No. PCT/JP2016/065408," dated Aug. 16, 2016.

Europe Patent Office, "Search Report for European Patent Application No. 16800040.4," dated Dec. 7, 2018.

\* cited by examiner

VEHICLE CUP-HOLDER WITH ILLUMINATING LIGHT GUIDE

FIELD OF TECHNOLOGY

The present invention relates to a lighting device that illuminates an opening edge portion of a receiving opening for an object to be stored in a storage member.

BACKGROUND ART

As for a lighting assembly which illuminates the entirety of a transparent ring by a light source at one portion, there is a lighting assembly shown in Patent Document 1.

PRIOR ART DOCUMENT

Patent Document

Patent Document 1: Japanese Unexamined Patent Application Publication No. 2010-525546

SUMMARY OF THE INVENTION

Problems to be Solved by the Invention

A main object of the present invention is to provide a lighting device which illuminates the opening edge portion of the receiving opening for the object to be stored in the storage member, wherein such opening edge portion can illuminate uniformly in any position with a simple structure.

Means for Solving the Problems

In order to obtain the aforementioned object, in the present invention, in a first aspect, a lighting device comprises a storage member provided with a receiving opening for an object to be stored, and a support bottom portion supporting the received object to be stored; a light source; and a loop-shaped light guide member including an incident portion for a light from the light source and a light emission surface formed along an edge of the receiving opening. The light guide member is provided with a gradually-reduced portion wherein both or any one of a distance between an inner peripheral portion and an outer peripheral portion, and a thickness of the light guide member is reduced as leaving from the incident portion.

In a case without the gradually-reduced portion, as increasing a distance from the incident portion, the light propagating the light guide member attenuates, so that as increasing the distance from the incident portion, luminance on the light emission surface tends to decline. However, the light propagated to the light guide member increases the number of refractions as reducing the distance between the inner peripheral portion and the outer peripheral portion, so that the gradually-reduced portion is formed so as to gradually increase the light leaking to an outside as increasing the distance from the incident portion.

Also, in order to obtain the aforementioned object, in the present invention, in a second aspect, the lighting device comprises the storage member provided with the receiving opening for the object to be stored, and the support bottom portion supporting the received object to be stored; the light source; and the loop-shaped light guide member including the incident portion for the light from the light source and the light emission surface formed along the edge of the receiving opening. The incident portion is positioned on an outer peripheral portion side of the light guide member, and a shielding wall along the receiving opening is positioned between the outer peripheral portion and the inner peripheral portion.

A tendency to increase the luminance on the light emission surface as reducing the distance from the incident portion can be prevented by the shielding wall.

Also, in order to obtain the aforementioned object, in the present invention, in a third aspect, the lighting device comprises the storage member provided with the receiving opening for the object to be stored, and the support bottom portion supporting the received object to be stored; the light source; and the loop-shaped light guide member including the incident portion for the light from the light source and the light emission surface formed along the edge of the receiving opening. The incident portion is positioned on the outer peripheral portion side of the light guide member, and the shielding wall along the receiving opening is positioned between the outer peripheral portion and the inner peripheral portion. Moreover, the light guide member is provided with the gradually-reduced portion wherein both or any one of the distance between the inner peripheral portion and the outer peripheral portion, and the thickness of the light guide member is reduced as separating from the incident portion.

In the case without the gradually-reduced portion, as increasing the distance from the incident portion, the light propagating the light guide member attenuates, so that as increasing the distance from the incident portion, the luminance on the light emission surface tends to decline. However, the light propagated to the light guide member increases the number of refractions as reducing the distance between the inner peripheral portion and the outer peripheral portion, so that the gradually-reduced portion is formed so as to gradually increase the light leaking to the outside as increasing the distance from the incident portion. Also, the tendency to increase the luminance on the light emission surface as reducing the distance from the incident portion can be prevented by the shielding wall. Thereby, the light emission surface of the light guide member can light up with uniform luminance over an entire circumference thereof as much as possible, and an opening edge portion of the receiving opening can illuminate at any position in the same manner by the light emission surface.

In one of preferred aspects of the present invention, the shielding wall is integrally formed in the storage member, and a concave portion complementarily receiving the shielding wall is formed in the light guide member.

Also, in one of the preferred aspects of the present invention, a side face facing the inner peripheral portion side of the light guide member in the shielding wall is visible through the light emission surface, and forms a visible side face increasing in inclination toward the outer peripheral portion side.

Also, in one of the preferred aspects of the present invention, the light guide member is clamped between the storage member and a cosmetic member provided with an opening following the receiving opening, and an edge portion of the opening of the cosmetic member is positioned on the visible side face.

Also, minute concave and convex parts may be formed on a slope face corresponding to the visible side face in the concave portion of the light guide member by an emboss processing. In such a case, by an irregular reflection due to the minute concave and convex parts, the light emission surface can appear to uniformly illuminate more evenly.

Effect of the Invention

According to the present invention, in the lighting device which illuminates the opening edge portion of the receiving opening for the object to be stored in the storage member, such opening edge portion can illuminate in any position uniformly, i.e., in such a way that bright portions and dark portions appear as little as possible, with a simple structure.

BEST MODES OF CARRYING OUT THE INVENTION

Figure 1:
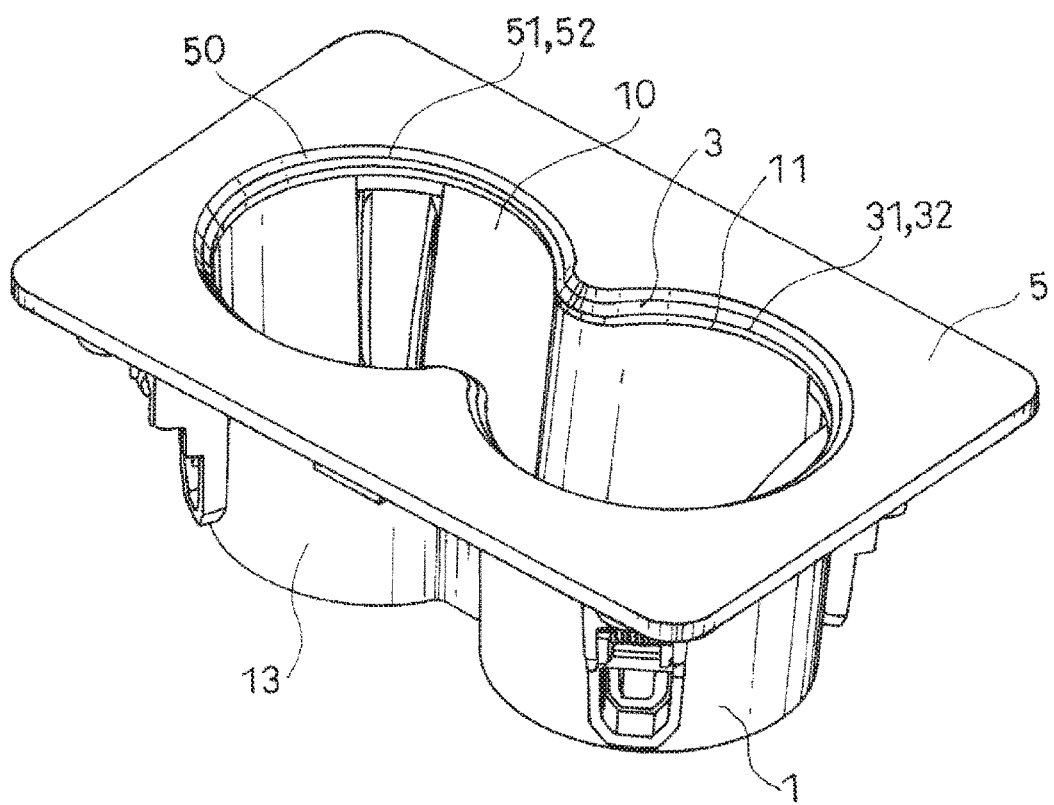
FIG. 1 is a perspective view of one structural example (a first example) of a lighting device according to one embodiment of the present invention.

Hereinafter, based on FIG. 1 to FIG. 12, typical embodiments of the present invention will be explained. A lighting device according to the present embodiments includes a storage member 1, a light source 2, and a light guide member 3, and is made so as to illuminate an opening edge portion 11 of a receiving opening 10 of an object to be stored in the storage member 1 in any position by the light source 2 and the light guide member 3.

In the illustrated examples, there are shown examples wherein the lighting device is a cup holder as a storage device used as an interior part for an automobile and the like. The light guide member 3 enhances a design property of such cup holder, and can insert a beverage container from a bottom side thereof into the cup holder unmistakably at night and the like.

First Example

First, the first example shown in FIG. 1 to FIG. 8 will be explained.

Figure 5:
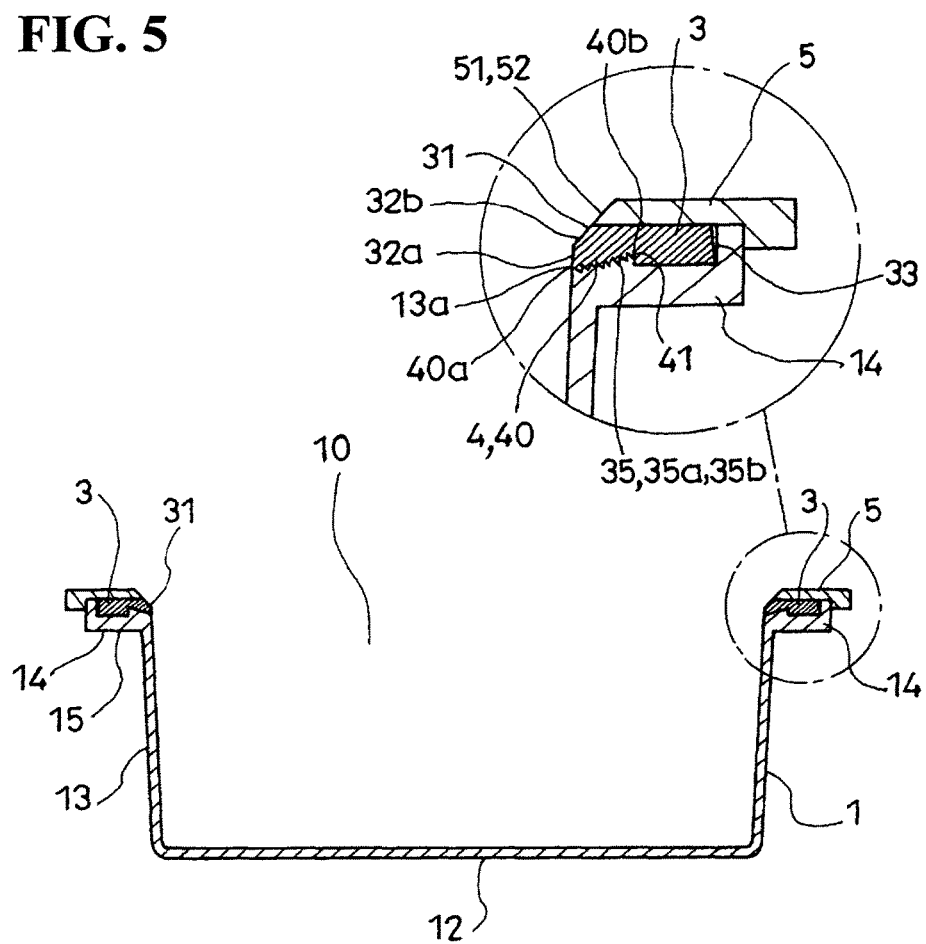
FIG. 5 is a cross-sectional view taken along a line B-B in FIG. 3.

The storage member 1 has a box shape provided with the receiving opening 10 receiving the beverage container as the object to be stored from a bottom portion side thereof; and a support bottom portion 12 supporting a bottom portion of the received beverage container. In the illustrated example, the storage member 1 is structured so as to be capable of simultaneously holding two beverage containers, and is structured so as to have a length that can receive the two beverage containers in parallel, and a width corresponding to a size of one beverage container. The reference numeral 13 in the drawings represents a side wall portion, and an upper end 13a (see FIG. 5) of the side wall portion 13 functions as the opening edge portion 11 of the receiving opening 10. As shown in FIG. 5, in the upper end 13a of the side wall portion 13, there is integrally connected an outer flange portion 14 projecting in a direction orthogonal to the side wall portion 13 in such a way so as to surround the receiving opening 10. On an upper portion of the storage member 1, there is formed a support portion 15 of the light guide member 3 by an upper face of such outer flange portion 14.

In the embodiment, by one light source 2 (see FIG. 4), the opening edge portion 11 of the receiving opening 10 of the storage member 1 illuminates in any position. In the illustrated example, such light source 2 is an LED 20. In the illustrated example, a base plate 21 on which the LED 20 is mounted is attached to the support portion 15 of the storage member 1 so as to integrate the storage member 1 and the light source 2. Specifically, in a position approximately in a middle in a length direction of the storage member 1, and on one side sandwiching the receiving opening 10, there is formed a concave portion 15a in the support portion 15, and there is formed a through hole 15b at a bottom of the concave portion 15a. Then, the base plate 21 is fixed to a lower face of the outer flange portion 14 in such a way that the LED 20 is positioned inside the through hole 15b (see FIG. 4).

Figure 3:
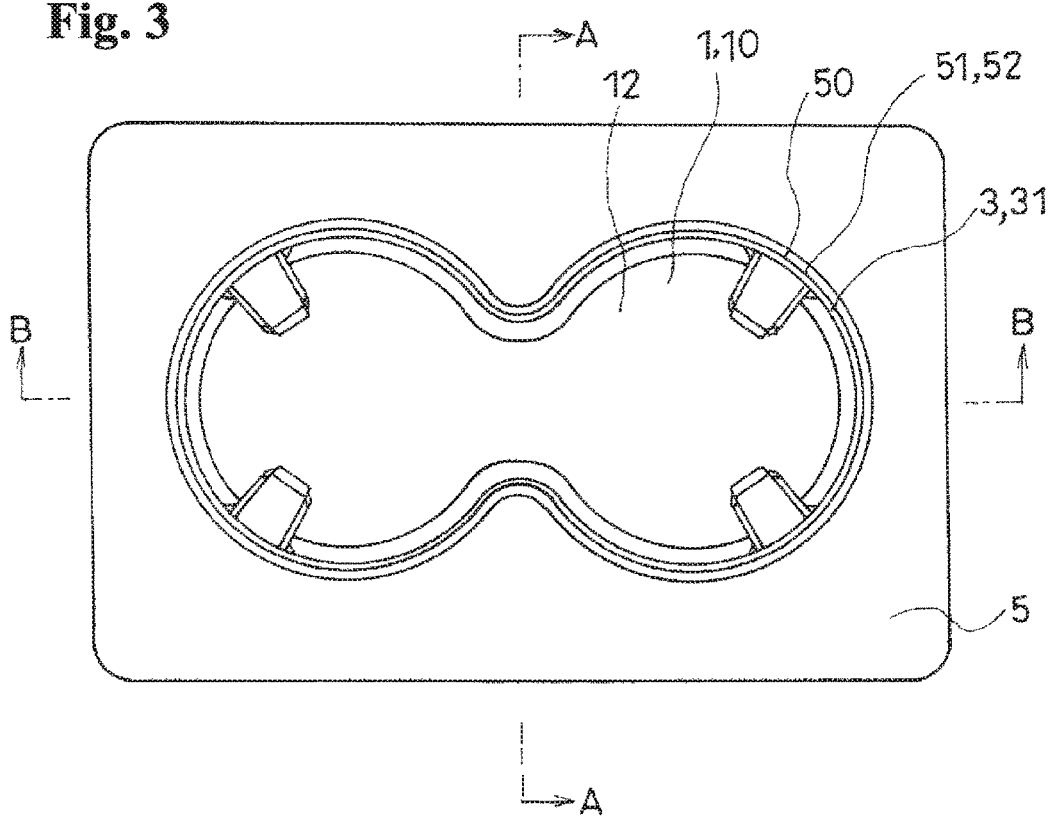
FIG. 3 is a plan view of the first example.

As shown in FIG. 3, the light guide member 3 includes an incident portion 30 for a light from the light source 2, and a light emission surface 31 formed along an edge of the receiving opening 10, and has a loop shape.

Figure 6:
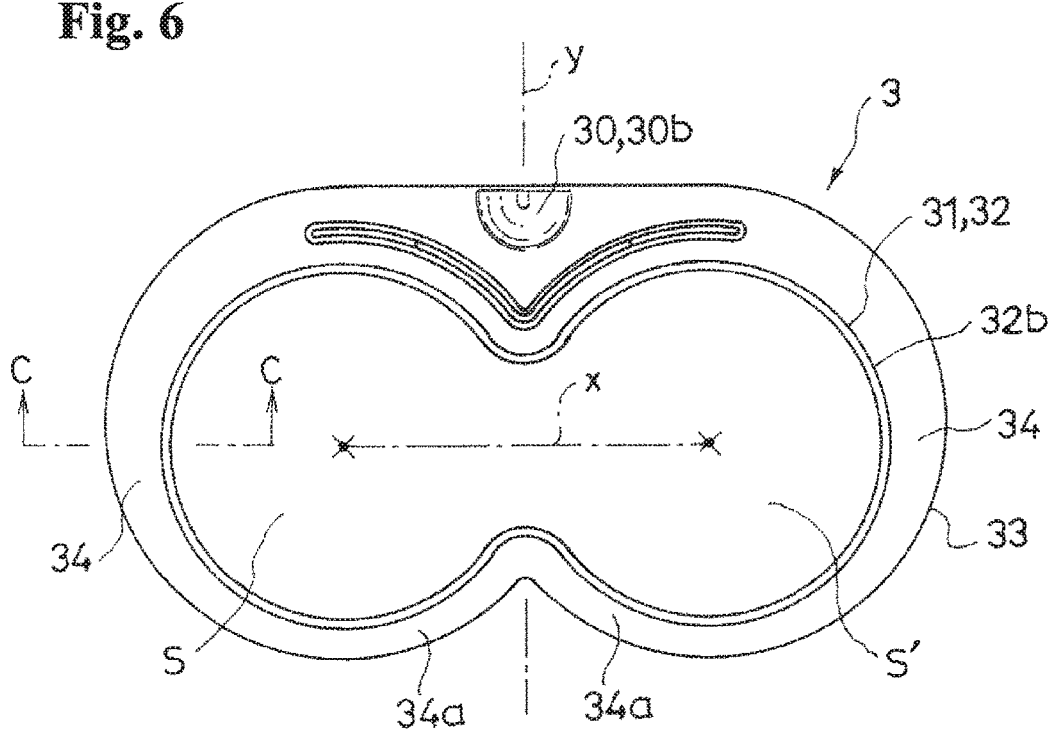
FIG. 6 is a plan view of a light guide member forming the first example.
Figure 7:
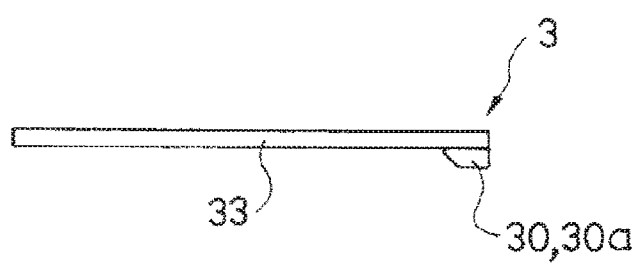
FIG. 7 is a side view of the light guide member forming the first example.
Figure 8:
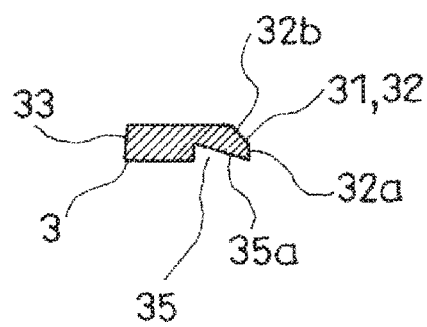
FIG. 8 is a cross-sectional view taken along a line C-C in FIG. 6.

In the illustrated example, as shown in FIG. 6, an outline shape in a plan view of an inner peripheral portion 32 of the light guide member 3 has a shape following an outline of the opening edge portion 11 of the receiving opening 10 of the storage member 1, and the light guide member 3 is structured so as to have a length and a width as well. Specifically, the outline shape in the plan view of the inner peripheral portion 32 of the light guide member 3 has a shape following an arc of an imaginary circle respectively on one side and the other side sandwiching a position approximately in a middle in a length direction thereof. Also, a width of the inner peripheral portion 32 of the light guide member 3 becomes narrower as coming close to the position approximately in the middle in the length direction, and a space S on one side and a space S' on the other side sandwiching the position approximately in the middle in the length direction communicate at the position approximately in the middle in the length direction. In the illustrated example, an upper portion of the inner peripheral portion 32 of such light guide member 3 functions as the light emission surface 31. An outline shape in a plan view of an outer peripheral portion of the light guide member 3 has a shape roughly following the outline shape in the plan view of the inside; however, on one side of a first imaginary line segment x (see FIG. 6) connecting a center of the space S on the one side and a center of the space S' on the other side, the outline shape in the plan view of the outer peripheral portion of the light guide member 3 has a straight line shape parallel to the first line segment x.

In the illustrated example, the incident portion 30 is formed on a second imaginary line segment y (see FIG. 6) orthogonal at a position approximately in a middle in a length direction of the light guide member 3 relative to the first line segment x, and on one side of the first line segment x. In the illustrated example, the incident portion 30 forms a convex portion 30a projecting downwardly (see FIG. 7). The convex portion 30a has a shape complementarily received in the concave portion 15a of the storage member 1. In the illustrated example, furthermore, there is formed a cavity 30b in the light guide member 3 directly above the convex portion 30a (see FIG. 4). Then, such light guide member 3 propagates a light from the light source 2 entering from the incident portion 30 so as to illuminate the entirety. Such light guide member 3 is only required to have a function of transmitting a light and illuminating the entirety by propagating the entered incident light, and can be formed by a heretofore known light transmitting material having such a function. Although it is not shown in the drawings, such incident portion 30 may be structured such that the light indirectly enters via another light guide member from the light source.

Figure 2:
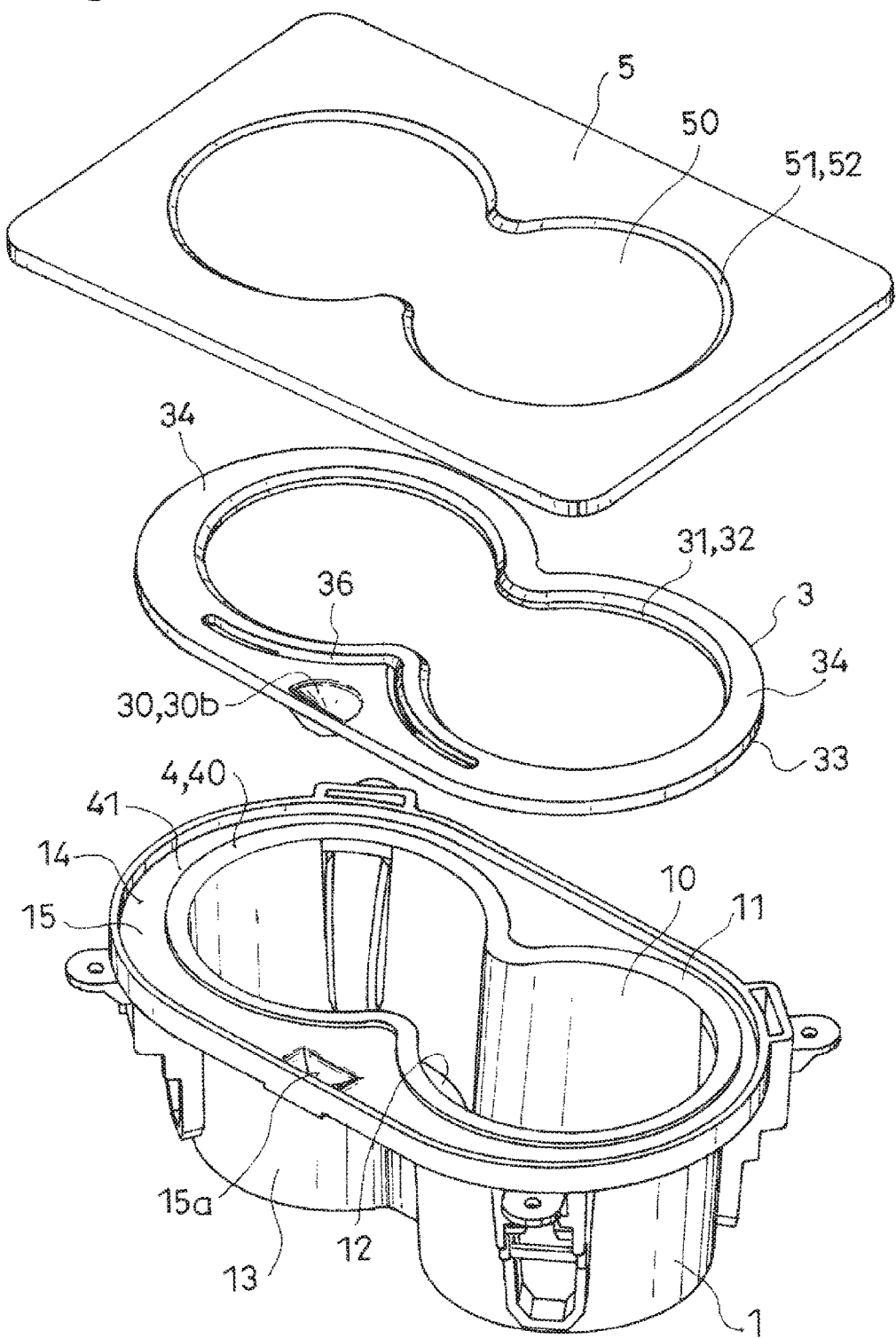
FIG. 2 is an exploded perspective view of the first example.

Also, as shown in FIG. 2, the incident portion 30 is positioned on an outer peripheral portion 33 side of the light guide member 3, and a shielding wall 4 along the receiving opening 10 is positioned between the outer peripheral portion 33 and the inner peripheral portion 32. Therewith, as shown in FIG. 6, the light guide member 3 is provided with gradually-reduced portions 34 that reduce a distance between the inner peripheral portion 32 and the outer peripheral portion 33 as separating from the incident portion 30.

In the illustrated example, the gradually-reduced portions 34 are respectively provided on both sides sandwiching the second line segment y. The distance between the inner peripheral portion 32 and the outer peripheral portion 33 is roughly equal to a terminal 34a of the gradually-reduced portions 34 on the second line segment y and on a side opposite to the incident portion 30 (see FIG. 6).

Also, in the embodiments, the shielding wall 4 is integrally formed with the storage member 1, and a concave portion 35 complementarily receiving the shielding wall 4 is formed in the light guide member 3. Specifically, in the embodiment, the shielding wall 4 is a convex piece formed on an upper face of the support portion 15 in such a way so as to form the edge of the receiving opening 10. Also, the concave portion 35 has a groove shape formed in a lower portion of the light guide member 3.

In a case without the gradually-reduced portions 34, as increasing a distance from the incident portion 30, the light propagating the light guide member 3 attenuates, so that as increasing the distance from the incident portion 30, luminance on the light emission surface 31 tends to decline. However, the light propagated to the light guide member 3 increases the number of refractions as reducing the distance between the inner peripheral portion 32 and the outer peripheral portion 33, so that the gradually-reduced portions 34 are formed so as to gradually increase a light leaking to an outside as increasing the distance from the incident portion 30. Also, a tendency to increase the luminance on the light emission surface 31 as reducing the distance from the incident portion 30 can be prevented by the shielding wall 4. Thereby, in the embodiments, the light emission surface 31 of the light guide member 3 can light with uniform luminance as much as possible over an entire circumference thereof, and the opening edge portion 11 of the receiving opening 10 can illuminate in any position in the same manner by the light emission surface 31.

Also, in the embodiment, as shown in FIG. 5, a side face facing the inner peripheral portion 32 side of the light guide member 3 in the shielding wall 4 is visible through the light emission surface 31, and forms a visible side face 40 having an inclination heightening toward the outer peripheral portion 33 side. Accordingly, the light emission surface 31 can appear to uniformly illuminate evenly. Incidentally, in the illustrated example, a side face facing the outer peripheral portion 33 side of the light guide member 3 in the shielding wall 4 is a step face 41 substantively orthogonal to a support face, and on an incident portion 30 side, a situation wherein the luminance of the light emission surface 31 is excessively enhanced is reliably prevented by the step face 41 of the shielding wall 4.

Figure 4:
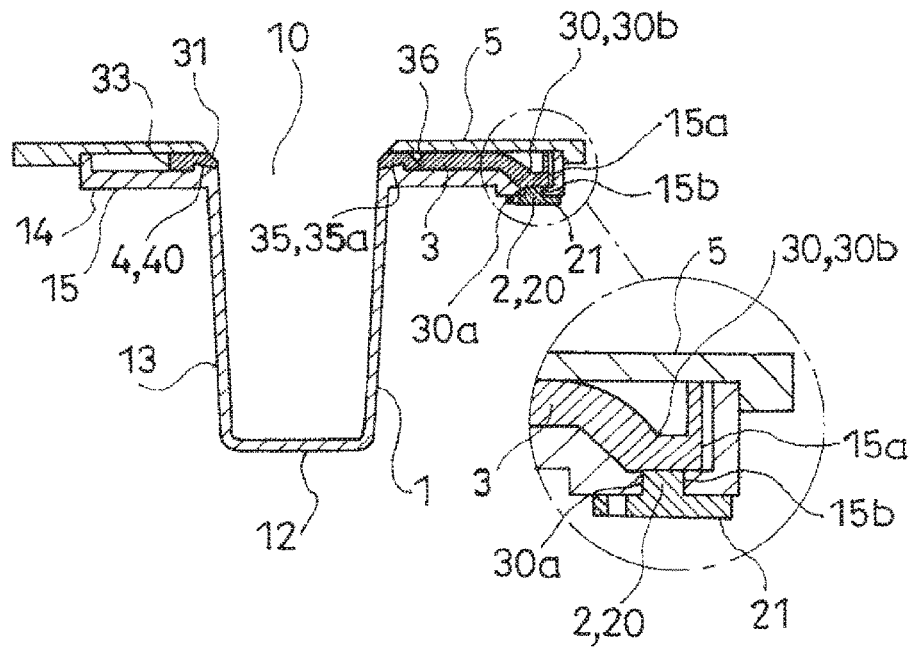
FIG. 4 is a cross-sectional view taken along a line A-A in FIG. 3.

Incidentally, in the illustrated example, as shown in FIG. 2 and FIG. 4, on an upper portion of the light guide member 3, on the incident portion 30 side, and in a portion between the incident portion 30 and the concave portion 35, there is formed a groove 36 having a depth up to a position approximately in a middle in a thickness direction of the light guide member 3 in such a way so as to follow an outline of the inner peripheral portion 32 of the light guide member 3, and even by this groove 36, the situation wherein the luminance of the light emission surface 31 is excessively enhanced on the incident portion 30 side is prevented.

In the illustrated example, in any position in a circumferential direction of the light guide member 3, an inclination lower end 40a of the visible side face 40 of the shielding wall 4 corresponds to the upper end 13a of the side wall portion 13 of the storage member 1 (see FIG. 5), and an inclination upper end 40b is positioned on the outer peripheral portion 33 side of the light guide member 3 more than the light emission surface 31. In the inner peripheral portion 32 of the light guide member 3, a portion below approximately the middle in the thickness direction of the light guide member 3 is a vertical portion 32a forming the same face as an inner face of the side wall portion 13 of the storage member 1, and a portion above that is an inclination portion 32b inclining in a direction of gradually increasing an inner diameter of the light guide member 3 as moving upwardly, and the vertical portion 32a and the inclination portion 32b form the light emission surface 31 (See FIG. 5).

Also, in the embodiment, as shown in FIG. 2, the light guide member 3 is clamped between the storage member 1 and a cosmetic member 5 provided with an opening 50 following the receiving opening 10. The cosmetic member 5 forms the opening in a plate-like member having a rectangular shape larger than the support portion 15 of the storage member 1 and the light guide member 3. After the shielding wall 4 is fitted in the concave portion 35 and the light guide member 3 is positioned on the support portion 15, the cosmetic member is superimposed on the light guide member 3, and three members are integrated so as to form the lighting device. Therewith, an edge portion 51 of the opening 50 of such cosmetic member 5 is positioned on the visible side face 40 (see FIG. 5). Thereby, a design effect, in which only opening edge portion 11 of the receiving opening 10 of the storage member 1 illuminates by the light emission surface 31 of the light guide member 3, is obtained. In the illustrated example, the opening edge portion of the cosmetic member 5 is formed with an inclination forming an inclination portion 52 allowing the object to be stored to be easily inserted onto the receiving opening 10 of the storage member 1 together with the inclination portion 32b of the inner peripheral portion 32 of the light guide member 3.

Minute concave and convex parts 35b may be formed on a slope face 35a corresponding to the visible side face 40 in the concave portion 35 of the light guide member 3 by an emboss processing. In such a case, by an irregular reflection due to the minute concave and convex parts 35b, the light emission surface 31 can appear to uniformly illuminate more evenly.

Second Example

Next, a second example shown in FIG. 9 to FIG. 12 will be explained.

In the second example, the gradually-reduced portions 34 of the light guide member 3 are formed in such a way so as to reduce both a distance w (see FIG. 12) between the inner peripheral portion 32 and the outer peripheral portion 33, and a thickness t (see FIG. 12, a size in an up-and-down direction of the light guide member) of the light guide member 3 as separating from the incident portion 30.

Figure 12:
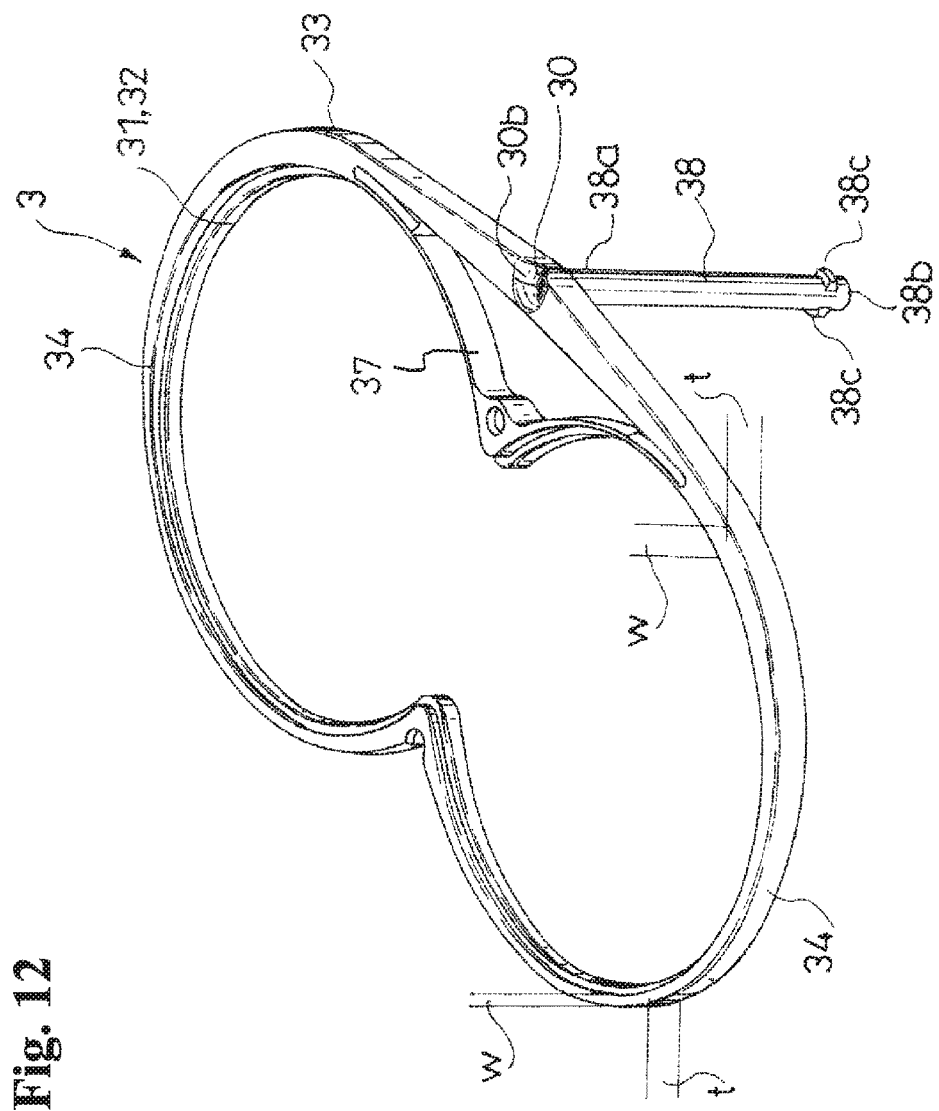
FIG. 12 is a perspective view of the light guide member forming the second example.

Also, in the second example, as shown in FIG. 12, in the portion between the incident portion 30 of the light guide member 3 and the concave portion 35, there is formed a hole portion 37 passing through the light guide member 3 in the up-and-down direction. An outline positioned on the inner peripheral portion 32 side of the hole portion 37 follows the outline of the inner peripheral portion 32, and an outline of the hole portion 37 has a mountain shape in a plan view. In the second example, even by such hole portion 37, an effect of preventing the situation wherein the luminance of the light emission surface 31 is excessively enhanced on the incident portion 30 side can be obtained.

Also, in the second example, the light guide member 3 includes a communication member 38 between the incident portion 30 and the light source 2. The communication member 38 has a rod shape, integrates an upper end 38a with a lower face of the light guide member 3 directly below the incident portion 30 of the light guide member 3, and projects downwardly.

Figure 10:
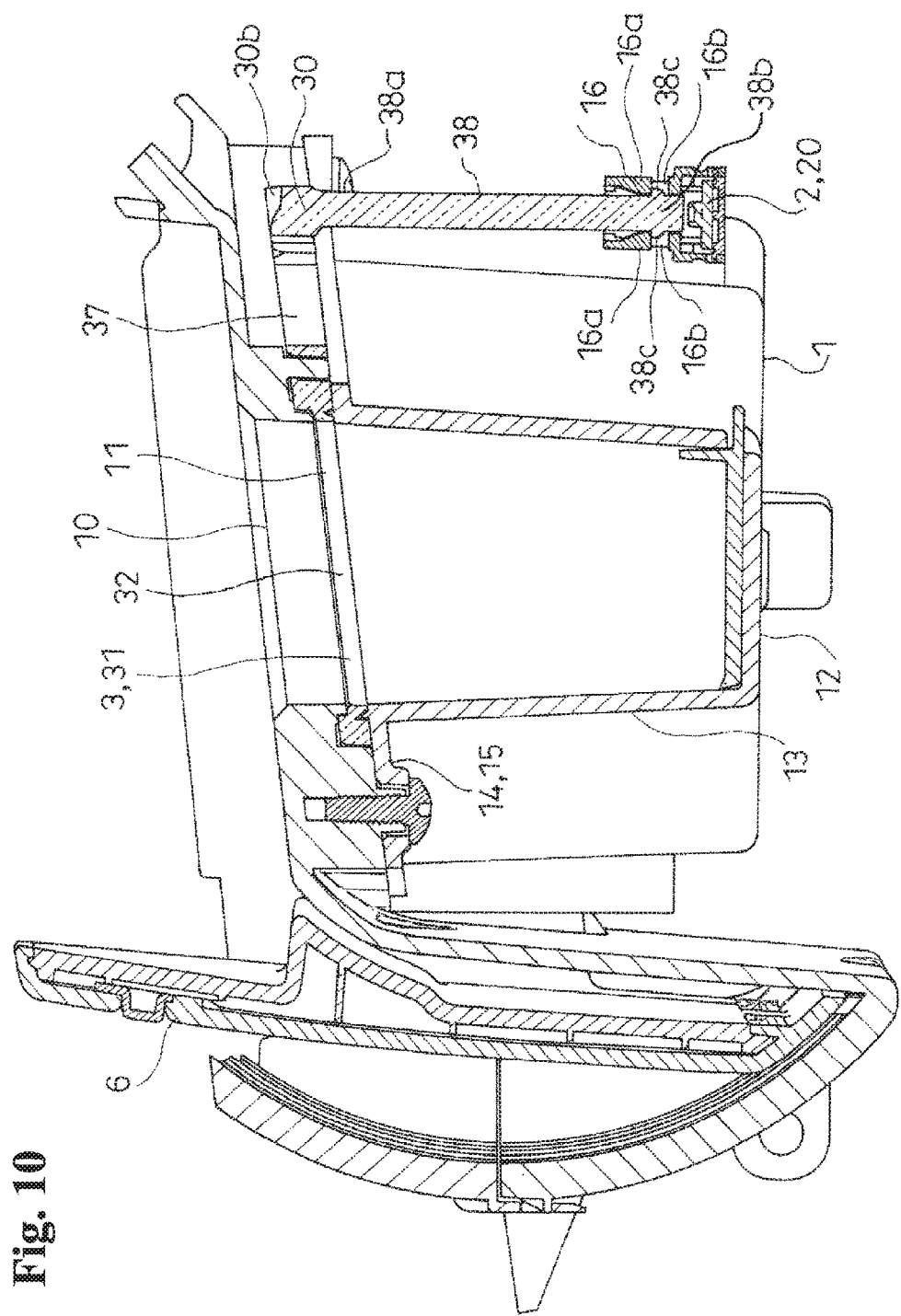
FIG. 10 is a cross-sectional view of the second example.
Figure 11:
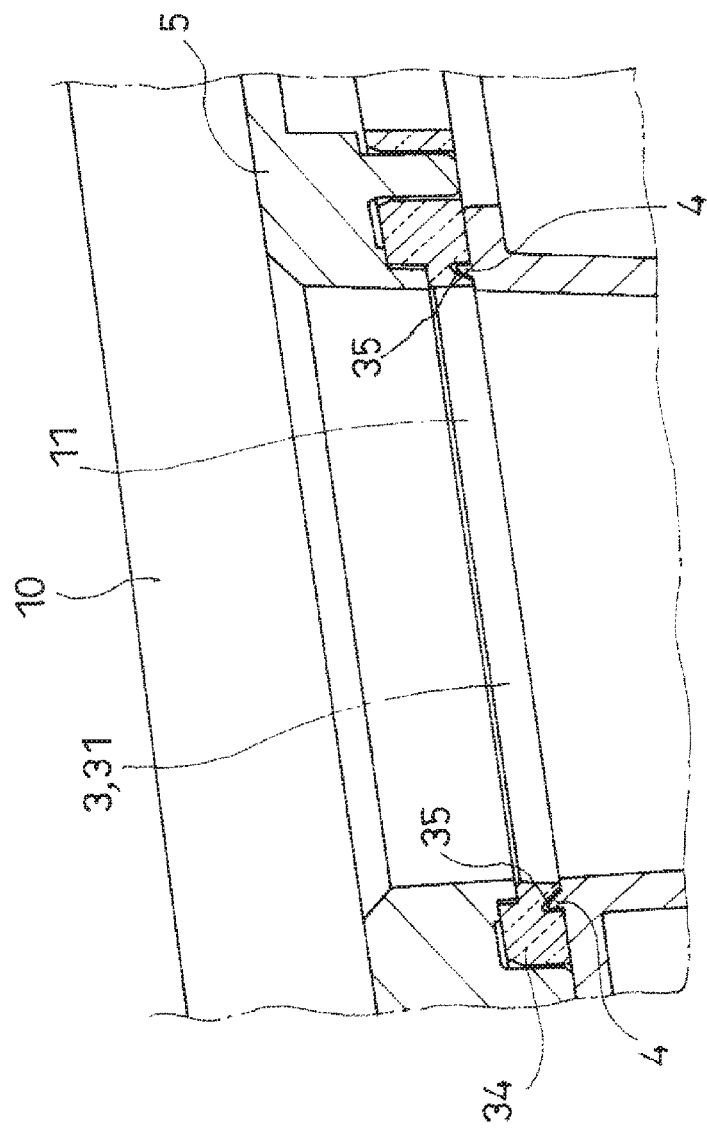
FIG. 11 is an enlarged view of essential parts in FIG. 10.

In the second example, as shown in FIG. 10, the light source 2 is provided outside the side wall portion 13 on a support bottom portion 12 side of the storage member 1. In the illustrated example, the light source 2 is disposed at a bottom portion of a cylindrical receiving portion 16 receiving a lower end 38b side of the communication member 38 from above.

One portion of a side wall of the cylindrical receiving portion 16 is an elastic engagement piece 16a. A window hole 16b is formed directly below the elastic engagement piece 16a. On the other hand, an engagement projection 38c is formed on the lower end 38b side of the communication member 38.

The light guide member 3 is assembled with the storage member 1 by inserting the communication member 38 into the cylindrical receiving portion 16. In this insertion process, the engagement projection 38c slidingly contacts with an inner face of the elastic engagement piece 16a, and the elastic engagement piece 16a bends to project outside once. When the communication member 38 is inserted into the cylindrical receiving portion 16 up to a position where the engagement projection 38c is entered into the window hole 16b, the elastic engagement piece 16a elastically returns, and a lower end thereof is positioned above the engagement projection 38c and caught on that so as to maintain the insertion state. In the assembled state, the light of the light source 2 enters into the incident portion 30 through the communication member 38.

In the second example, by the communication member 38 and the cylindrical receiving portion 16, the light guide member 3 can be assembled with the storage member 1 easily and properly. Also, by the communication member 38 and the cylindrical receiving portion 16, the light source 2 can be disposed on a bottom portion side of the storage member 1 which does not affect a design property of the lighting device, and flexibility in an installation space or a layout of the light source 2 is enhanced.

Figure 9:
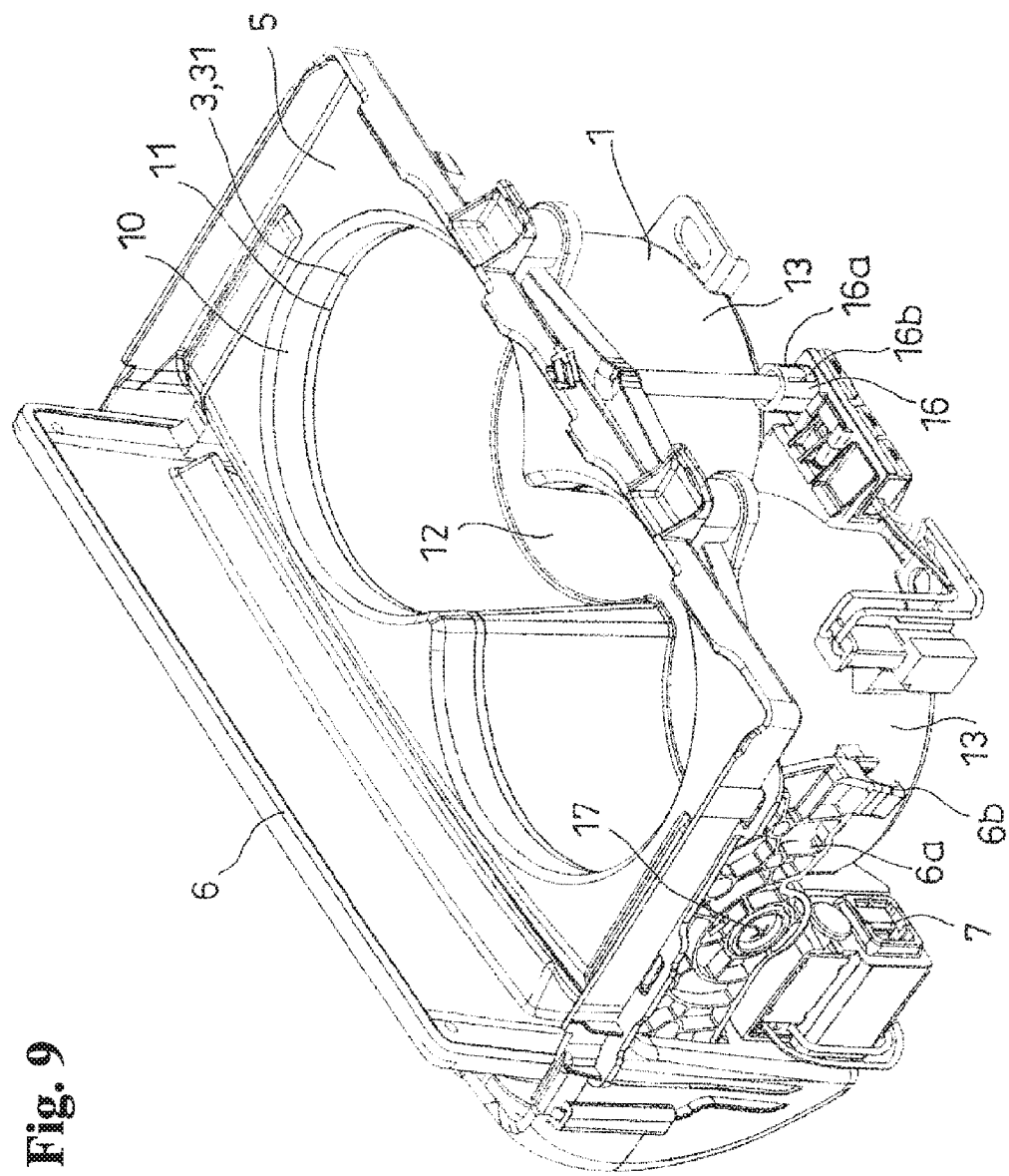
FIG. 9 is a perspective view of one structural example (a second example) of the lighting device according to one embodiment of the present invention.

Also, in the second example, as shown in FIG. 9, the storage member 1 includes a lid 6 having a rectangular plate shape. The lid 6 includes arms 6a on right and left. The arms 6a are positioned outside the side wall portions 13 on a width side of the storage member 1, and are axially supported on the side wall portions 13 by a shaft support member 17. The lid 6 turns in a range of substantially 90 degrees from an open position (see FIG. 9) positioned on one outer side of the side wall portions 13 on a length side of the storage member 1 to a closing position closing the receiving opening 10.

In the illustrated example, when the lid 6 moves to the closing position, striker members 6b provided in a tip of the arms 6a enter into latch members 7 provided on outer sides of the side wall portions 13 on the width side and are engaged so as to maintain a state wherein the lid 6 is located in the closing position. Such latch member 7 is formed to release the striker member 6b by releasing the engagement when the lid 6 located in the closing position is slightly pushed in further. In the illustrated example, the lid 6 is always urged toward the open position by an urging device which is not shown in the drawings, and when the lid 6 located in the closing position is slightly pushed in further to release the striker member 6b from the latch member 7, the lid 6 automatically moves up to the open position.

If a switch forming one portion of a circuit supplying electricity to the light source 2 is integrated into the latch member 7, and the switch is set to be opened (OFF) only at a time of the engagement, when the lid 6 is located in the closing position, the electricity is not supplied to the light source 2, and at the same time when the lid 6 opens, the electricity is supplied to the light source 2 so as to illuminate the opening edge portion 11 of the receiving opening 10 of the storage member 1 by the light guide member 3.

Remaining structural elements in the second example explained in above are the same or substantially the same as those in the first example, so that regarding the remaining structural elements, the same symbols used in FIG. 1 to FIG. 8 showing the first example are assigned to the remaining structural elements in FIG. 9 to FIG. 12 showing the second example, and their explanations are omitted.

Incidentally, obviously, the present invention is not limited to the above-explained embodiments, and includes all embodiments which can obtain the object of the present invention.

EXPLANATION OF SYMBOLS 1 a storage member
10 a receiving opening
12 a support bottom portion
2 a light source
3 a light guide member
30 an incident portion
31 a light emission surface
32 an inner peripheral portion
33 an outer peripheral portion
34 gradually-reduced portions
4 a shielding wall Incidentally, all contents of the specification, claims, drawings, and abstract of Japanese Patent Application No. 2015-108239 filed on May 28, 2015 are cited in their entireties herein and are incorporated as a disclosure of the specification of the present invention.

What is claimed is:
1. A lighting device, comprising:
a storage member provided with a receiving opening for an object to be stored, and a support bottom portion for supporting the object received through the receiving opening;
a light source; and a loop-shaped light guide member including an incident portion for a light from the light source and a light emission surface formed along an edge of the receiving opening, wherein the light guide member includes a portion where at least one of a distance between an inner peripheral portion and an outer peripheral portion, and a thickness of the light guide member, is gradually reduced away from the incident portion in a circumferential direction of the receiving opening, the incident portion is positioned on a side of the outer peripheral portion of the light guide member, a shielding wall along the receiving opening is positioned between the outer peripheral portion and the inner peripheral portion and is integrally formed with the storage member, the light guide member includes a concave portion to complementarily receive the shielding wall, the storage member includes a side wall portion extending upwardly from an outer peripheral portion of the bottom portion and surrounding the receiving opening, and an outer flange portion projecting outwardly from an upper end of the side wall portion and having a support portion supporting the light guide member on an upper surface of the outer flange portion, the shielding wall includes a step face extending upwardly from the support portion and a side face inclinedly extending from an upper end of the step face toward the receiving opening to form a convex portion corresponding to the concave portion, the support portion includes another concave portion at one side thereof and a through hole at a lower end of the another concave portion, and the incident portion includes a cavity fit into the another concave portion, and the light source is connected to the light guide member through the through hole.

2. A lighting device according to claim 1, wherein the incident portion is arranged outside a center portion of the receiving opening, and the portion where the at least one of distance between the inner peripheral portion and the outer peripheral portion and a thickness of the light guide member, is gradually reduced, extends along the edge of the receiving opening and has a minimum distance at a location opposite to the incident portion in the circumferential direction of the receiving opening.

3. A lighting device according to claim 2, wherein the light guide member further includes a groove between the incident portion and the inner peripheral portion to prevent the light emission surface from being excessively enhanced at a side of the incident portion.

4. A lighting device according to claim 1, wherein the side face faces a side of the inner peripheral portion of the light guide member in the shielding wall, is seen through the light emission surface, and increases in inclination toward the outer peripheral portion.

5. A lighting device according to claim 4, further comprising a cosmetic member including an opening corresponding to the receiving opening and arranged on the light guide member, wherein the light guide member is clamped between the storage member and the cosmetic member, and an edge portion of the opening of the cosmetic member is positioned above the side face.

6. A lighting device according to claim 4, wherein the concave portion of the light guide member includes a slope face corresponding to the inclination of the side face in the shielding wall and having minute concave and convex parts formed by an emboss processing.

* * * * *